United States Patent
Po' et al.

(10) Patent No.: US 6,174,973 B1
(45) Date of Patent: Jan. 16, 2001

(54) PROCESS FOR THE PREPARATION OF VINYLAROMATIC POLYMERS WITH A HIGH DEGREE OF SYNDIOTAXY

(75) Inventors: Riccardo Po', Leghorn; Luigi Abbondanza, Novara, both of (IT)

(73) Assignee: Enichem S.p.A., San Donato Milanese (IT)

( * ) Notice: Under 35 U.S.C. 154(b), the term of this patent shall be extended for 0 days.

(21) Appl. No.: 09/415,912

(22) Filed: Oct. 12, 1999

(30) Foreign Application Priority Data

Oct. 15, 1998 (IT) .............................................. MI98A2219

(51) Int. Cl.$^7$ ................................. C08F 12/04; C08F 4/64
(52) U.S. Cl. ......................... 526/158; 526/153; 526/157; 526/160; 526/346; 526/347.2; 502/132; 502/153
(58) Field of Search ..................................... 526/157, 158, 526/160, 347.2, 153; 502/132, 153

(56) References Cited

U.S. PATENT DOCUMENTS

| | | | |
|---|---|---|---|
| 4,680,351 | * | 7/1987 | Miro et al. ........................ 526/157 X |
| 4,740,570 | * | 4/1988 | Klabunde et al. ................ 526/157 X |
| 5,629,391 | | 5/1997 | Cardi et al. . |
| 5,721,327 | | 2/1998 | Santi et al. . |
| 5,830,959 | | 11/1998 | Po' et al. . |

FOREIGN PATENT DOCUMENTS 195 46 096 A1  6/1997 (DE).

OTHER PUBLICATIONS

Chemical Abstracts, vol. 120, No. 8, Feb. 21, 1994, JP 5–239138, Sep. 17, 1993.

* cited by examiner

*Primary Examiner*—Fred Teskin
(74) *Attorney, Agent, or Firm*—Oblon, Spivak, McClelland, Maier & Neustadt, P.C.

(57) ABSTRACT

Process for the preparation of crystalline vinylaromatic polymers with a high degree of syndiotaxy which comprises polymerizing vinylaromatic monomers in the presence of a catalytic system essentially consisting of:

a) a complex of titanium having the general formula:

$$CpTiX_1X_2X_3 \qquad (I)$$

wherein Cp represents a cyclopentadienyl ligand whereas $X_1$, $X_2$, $X_3$, the same or different, are selected from a halogen such as chlorine, or from alkyl groups, alkoxides, carboxylates, di(alkyl) amides;

b) a polyalkylaluminoxane wherein the alkyl group contains from 1 to 8 carbon atoms;

c) aluminum trifluoride.

9 Claims, No Drawings

PROCESS FOR THE PREPARATION OF VINYLAROMATIC POLYMERS WITH A HIGH DEGREE OF SYNDIOTAXY

The present invention relates to a process for the preparation of vinylaromatic polymers with a high degree of syndiotaxy.

More specifically, the present invention relates to a process for the preparation of crystalline poly-styrene in which the polymeric chains have an essentially syndiotactic configuration and the catalyst suitable for the purpose.

Polystyrene is a thermoplastic polymer obtained by the radicalic polymerization of styrene having an atactic stereo structure. It is an amorphous polymer, with excellent insulating properties and reasonable thermal resistance and is used in the production of moulded articles, films, materials for household appliances, packaging, etc. For numerous applications however, it is preferable to use crystalline materials with a high thermal resistance and resistance to solvents, characteristics which atactic polystyrene does not have.

European patent 210.615 describes a polystyrene having a structure characterized by a high degree of stereoregularity, in which the phenyl substituents are arranged, in the polymeric chain, in such a way as to give a syndiotactic polymer. This material does not have the above disadvantages of atactic polystyrene as it is crystalline and consequently, once transformed, can be subjected to orientation processes; it is insoluble in almost all organic solvents and has a melting point within the range of 260–280° C., giving it a high thermal resistance, comparable to or higher than that of condensation thermoplastic polymers (polyesters, polyamides, polyimides, etc.).

Syndiotactic polystyrene can be prepared according to what is described in literature, for example according to what is disclosed in European patent EP 272.584 or in U.S. Pat. No. 4,978,730, by polymerization catalyzed by compounds of Ti, Zr, in the presence of a cocatalyst represented by MAO, methylaluminoxane (a mixture of cyclic and linear oligomers containing the repetitive unit —AlCH$_3$O—), or, as described in published European patent application 421.659, by derivatives of boron containing fluorinated groups.

Both the cocatalyst MAO and fluorinated boranes are costly high-quality products and it would therefore be preferable to reduce the amount in the catalytic formulation.

Scientific literature cites studies for finding alternatives to MAO or fluorinated boranes. For example, it is known that the addition of certain aluminum alkyls, such as aluminum triisobutyl, to titanium/MAO systems can increase, under particular experimental conditions, the catalytic activity even if this result is not verified under all conditions such as, for example, with low molar ratios aluminum/titanium. Apart from this, a non-correct concentration of aluminum alkyl may cause a considerable reduction in the molecular weight of the polymer or, in the case of aluminum trimethyl, act in the completely opposite way causing a lowering in the polymerization yields ("Polymer", 39, 959, 1998).

It has also been observed that zinc diphenyl increases the catalytic activity of titanium metallocenes activated with MAO ("Polymer Bulletin", Berlin, 39, 693, 1997). However, zinc diphenyl is also an expensive high-quality product and also causes the formation of fractions of atactic polymer to a greater degree than MAO.

By treating hydrated salts such as Ti(SO$_4$)$_2$.4H$_2$O or K$_2$TiO(C$_2$O$_4$)$_2$.2H$_2$O with aluminum trimethyl, catalysts are obtained with a reasonable activity ("Makromoleculare Chemie, Rapid Communications", 9, 351, 1988). These however are systems based on MAO which is formed in situ by the reaction of aluminum alkyl with the hydration water of the salt.

Catalytic systems containing hemimetallocene derivatives of titanium, activated with aluminum trimethyl and hexaalkyldistannoxanes or dialkyltin oxides, are described in U.S. Pat. No. 5,326,837. Also in this case however the activities are lower than those of the systems based on MAO and additionally contain toxic derivatives of tin.

The Applicant has now found that it is possible to obtain crystalline vinylaromatic polymers, in particular crystalline polystyrene, having a configuration with a high degree of syndiotaxy and with high yields, by adding to the traditional catalytic systems based on titanium and MAO, aluminum trifluoride also in partial substitution of the MAO itself.

The present invention therefore relates to a process for the preparation of crystalline vinylaromatic polymers with a high degree of syndiotaxy which comprises polymerizing vinylaromatic monomers, alone or mixed with at least another copolymerizable ethylenically unsaturated monomer, in the presence of a catalytic system essentially consisting of:

a) a complex of titanium having the general formula:

$$CpTiX_1X_2X_3 \qquad (I)$$

wherein Cp represents a cyclopentadienyl ligand optionally substituted with C$_1$–C$_{10}$ alkyl radicals, whereas X$_1$, X$_2$, X$_3$, the same or different, are selected from a halogen such as chlorine, or from alkyl groups, alkoxides, carboxylates, di(alkyl)amides having from 1 to 10 carbon atoms;

b) a polyalkylaluminoxane in which the alkyl group contains from 1 to 8 carbon atoms, preferably MAO;

c) aluminum trifluoride.

The use of component (c) in the catalytic mixture of the present invention allows, as shown hereafter, higher conversions to be obtained (even higher than 100%) under the same reactions conditions, with respect to the mixture without this component, or a reduction in the absolute quantity of component (b) to reach a specific conversion.

The compounds having general formula (I) are products known in literature and described in "Progress in Polymer Science" vol. 21, page 47, 1996.

Typical examples of titanium complexes having formula (I), particularly suitable for the present invention are: CpTiCl$_3$; CpTi(OCH$_3$)$_3$; CpTi(OC$_2$H$_5$)$_3$; CpTi(OC$_3$H$_7$)$_3$; CpTi(Oi—C$_3$H$_7$)$_3$; CpTi(OC$_4$H$_9$)$_3$; [Cp(CH$_3$)$_5$]TiCl$_3$; [Cp(CH$_3$)$_5$]TiBr$_3$; [Cp(CH$_3$)$_5$]TiF$_3$; CpTi(OC$_5$H$_6$)$_3$; [Cp(CH$_3$)$_5$]Ti(OCH$_3$)$_3$; [Cp(CH$_3$)$_5$]Ti(OC$_2$H$_5$)$_3$; [Cp(CH$_3$)$_5$]Ti(OC$_3$H$_7$)$_3$; [Cp(CH$_3$)$_5$]Ti(OC$_4$H$_9$)$_3$; [Cp(CH$_3$)$_5$]Ti(OC$_5$H$_6$)$_3$; CpTiH$_3$; CpTi(CH$_3$)$_3$; CpTi(C$_2$H$_5$); CpTi(CH$_2$C$_5$H$_6$)$_3$; [Cp(CH$_3$)$_5$]TiH$_3$; [Cp(CH$_3$)$_5$]Ti(CH$_3$)$_3$; [Cp(CH$_3$)$_5$]Ti(C$_2$H$_5$)$_3$; [Cp(CH$_3$)$_5$]Ti(CH$_2$C$_5$H$_6$)$_3$; CpTi(OPh)$_3$; [Cp(CH$_3$)$_5$]Ti(OPh)$_3$. Particularly preferred are the complexes in which the cyclopentadienyl group is pentamethyl substituted.

The compounds of titanium having general formula (I) are added to the polymerization mixture in such a quantity that the molar ratio vinylaromatic monomer/Ti is between 10,000 and 1,000,000, preferably between 100,000 and 500,000.

The polyalkylaluminoxane (cocatalyst) essentially consists of mixtures of products having a linear, cyclic or caged structure. In the first case the structure is represented by general formula (II):

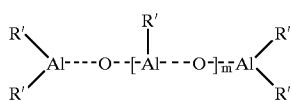

(II)

whereas in the second case by general formula (III):

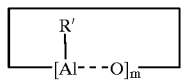

(III)

wherein m represents an integer between 1 and 40 and R' is a $C_1$–$C_8$ alkyl radical, for example it is preferably a methyl. The caged structure is described in Molecular Symposium, Vol 97, 1995.

Polyalkylaluminoxanes are known in literature and described, for example, in published European patent applications 272.584 and 421.659 or in U.S. Pat. No. 4,978,730.

The cocatalyst can be treated at a temperature ranging from 20 to 80° C. under vacuum for at least an hour, and can then be added to the polymerization mixture as such or in the form of a solution in a suitable solvent, for example toluene.

The cocatalyst is generally used in such quantities that the molar ratio aluminum/Ti is between 50 and 5,000.

According to the process of the present invention, the catalytic system described above may optionally also comprise an aluminum alkyl in which the alkyl group contains from 1 to 6 carbon atoms, for example aluminum trimethyl, aluminum triethyl, aluminum triisobutyl, etc. so as to substitute a part of cocatalyst corresponding to a percentage varying from 0 to 75% in moles.

The catalytic composition of the present invention also comprises aluminum trifluoride in such a quantity that the ratio between the moles of polyalkylaluminoxane (b), or the sum of polyalkylaluminoxane moles and the possible aluminum alkyl, and moles of aluminum fluoride is between 15 and 1.

The aluminum fluoride can be used as such or complexed with water (trifluoride hydrate) or with linear or cyclic ethers such as, for example, diethylether, tetrahydrofuran, dioxane or dimethoxyethane, with ketones such as acetone or methylethylketone, esters such as ethylacetate or ethylbenzoate, etc. Aluminum trifluoride hydrate is preferred.

The term "vinylaromatic polymers" as used in the present description and claims essentially refers to polymers of styrene and derivatives of styrene and the relative copolymers containing up to 20% in moles of another copolymerizable monomer selected from those having general formula (IV):

$$CH_2=CH-R''$$ (IV)

wherein R'' represents a hydrogen atom or a $C_1$–$C_6$ alkyl radical or a $C_4$–$C_{12}$ cycloalkyl radical.

Derivatives of styrene comprise styrene alkyls, in which the alkyl group contains from 1 to 4 carbon atoms, halogenated styrenes, $C_1$–$C_4$ alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methyl-styrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc.

The polymerization reaction can be carried out in mass or in a solvent. In the latter case the solvent may consist of aliphatic or aromatic hydrocarbons or their mixtures and is used in such quantities that the volume ratio solvent/monomers is between 0 and 10. The preferred solvent is toluene.

More specifically, according to the general procedure adopted for this type of reaction, the vinylaromatic monomers are subjected, before polymerization, to treatment for eliminating catalytic poisons such as phenolic stabilizers, water, phenylacetylene, consisting in distillation, passage on columns containing activated molecular sieves or activated alumina, etc. The monomers and, optionally, the solvent are charged into the reaction apparatus together with the possible aluminum alkyl and cocatalyst. After a time varying from 5 seconds to 30 minutes, the catalytic system is then added, preferably in the form of a solution. The reaction proceeds for times ranging from 15 minutes to 10 hours at temperatures varying from 20 to 100° C. At the end, the polymer obtained is recovered with the traditional methods.

Some illustrative but non-limiting examples are provided for a better understanding of the present invention and for its embodiment.

Analysis procedures:

The percentage of syndiotactic polymer is determined by extracting the polymer with acetone or methylethylketone (MEK) at boiling point for 10–20 hours.

The degree of stereoregularity is determined by means of nuclear magnetic resonance spectroscopy of carbon 13 as described in U.S. Pat. No. 4,680,353.

EXAMPLE 1

20 ml of styrene (0.175 moles) purified by passage on a basic alumina column, 0.84 ml of a 1.57 M solution of MAO in toluene ($1.31\times10^{-3}$ moles), 20 mg of aluminum trifluoride trihydrate ($1.45\times10^{-4}$ moles) and 0.15 ml of an 0.01M solution of Cp.TiCl$_3$ in toluene ($1.5\times10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 9.402 g of polymeric product were obtained (yield 51.7%).

2.859 g of polymer were extracted with methylethylketone at boiling point for 8 hours, producing 2.578 g of syndiotactic polystyrene (insoluble fraction of 90.2%, syndiotactic polystyrene yield: 46.6%) with stereoregularity of 99.9% and with a weight average molecular weight Mw of 468,000.

COMPARATIVE EXAMPLE 1

13.7 ml of styrene (0.12 moles) purified by passage on a basic alumina column, 0.57 ml of a 1.57M solution of MAO in toluene ($8.8\times10^{-4}$ moles) and 0.1 ml of an 0.01M solution of Cp.TiCl$_3$ in toluene ($1.0\times10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 5.020 g of polymeric product were obtained (yield 40.3%).

2.581 g of polymer were extracted with methylethylketone at boiling point for 8 hours, producing 2.374 g of syndiotactic polystyrene (insoluble fraction of 92%, syndiotactic polystyrene yield: 37.1%) with stereoregularity of 99.9% and with a weight average molecular weight Mw of 619,000.

COMPARATIVE EXAMPLE 2

20 ml of styrene (0.175 moles) purified by passage on a basic alumina column, 0.84 ml of a 1.57M solution of MAO in toluene ($1.32 \times 10^{-3}$ moles), 18 mg of sodium fluoride ($4.3 \times 10^{-4}$ moles) and 0.15 ml of an 0.01M solution of $Cp.TiCl_3$ in toluene ($1.5 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 467 mg of polymeric product were obtained (yield 2.6%) which was not analyzed further.

Comparative example 2 shows that it is not sufficient to have any fluoride to obtain an improvement in the catalytic activity.

COMPARATIVE EXAMPLE 3

13.7 ml of styrene (0.12 moles) purified by passage on a basic alumina column, 0.57 ml of a 1.57M solution of MAO in toluene ($8.8 \times 10^{-3}$ moles), 25 mg of calcium sulfate dihydrate ($1.45 \times 10^{-4}$ moles) and 0.1 ml of an 0.01M solution of $Cp.TiCl_3$ in toluene ($1.0 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 1.622 g of polymeric product were obtained (yield 13%) which was not analyzed further.

COMPARATIVE EXAMPLE 4

20 ml of styrene (0.175 moles) purified by passage on a basic alumina column, 0.84 ml of a 1.57M solution of MAO in toluene ($1.31 \times 10^{-3}$ moles), 61 mg of ytterbium acetate tetrahydrate ($1.45 \times 10^{-4}$ moles) and 0.15 ml of an 0.01M solution of $Cp.TiCl_3$ in toluene ($1.5 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 2.176 g of polymeric product were obtained (yield 12%) which was not analyzed further.

Comparative examples 3 and 4 show that the activator component is not represented by complexation water of aluminum fluoride and that any salt hydrate is therefore not sufficient to obtain improvements (on the contrary, there are deteriorations).

EXAMPLE 2

20 ml of styrene (0.175 moles) purified by passage on a basic alumina column, 0.42 ml of a 1.57M solution of MAO in toluene ($6.59 \times 10^{-4}$ moles), 10 mg of aluminum trifluoride trihydrate ($7.24 \times 10^{-5}$ moles) and 0.15 ml of an 0.01M solution of $Cp.TiCl_3$ in toluene ($1.5 \times 10^{-6}$ moles) were charged into a tailed test-tube under an inert atmosphere.

20 The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 7.546 g of polymeric product were obtained (yield 41.5%).

2.092 g of polymer were extracted with methylethylketone at boiling point for 8 hours, producing 1.942 g of syndiotactic polystyrene (insoluble fraction of 92.8%, syndiotactic polystyrene yield: 38.5%) with stereoregularity of 99.9% and with Mw of 546,000.

EXAMPLE 3

22.9 ml of styrene (0.2 moles) purified by passage on a basic alumina column, 0.57 ml of a 1.57M solution of MAO in toluene ($8.95 \times 10^{-4}$ moles), 14 mg of aluminum trifluoride trihydrate ($1.01 \times 10^{-4}$ moles) and 0.1 ml of an 0.01M solution of $Cp.TiCl_3$ in toluene ($1.0 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 5.320 g of polymeric product were obtained (yield 25.6%).

20 3.070 g of polymer were extracted with methylethylketone at boiling point for 8 hours, producing 2.800 g of syndiotactic polystyrene (insoluble fraction of 91.2%, syndiotactic polystyrene yield: 23.3%) with stereoregularity of 99.9% and with Mw of 493,000.

EXAMPLE 4

20 ml of styrene (0.175 moles) purified by passage on a basic alumina column, 0.22 ml of a 1.57M solution of MAO in toluene ($3.45 \times 10^{-4}$ moles), 20 mg of aluminum trifluoride trihydrate ($1.45 \times 10^{-4}$ moles), 0.35 ml of a 1M solution of aluminum triisobutyl in toluene ($3.5 \times 10^{-4}$ moles) and 0.12 ml of an 0.01M solution of $Cp.TiCl_3$ in toluene ($1.2 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 9.261 g of polymeric product were obtained (yield 50.1%).

3.800 g of polymer were extracted with methylethylketone at boiling point for 8 hours, producing 3.523 g of syndiotactic polystyrene (insoluble fraction of 92.7%, syndiotactic polystyrene yield: 46.4%) with stereoregularity of 99.9% and with Mw of 368,000.

COMPARATIVE EXAMPLE 5

17.2 ml of styrene (0.15 moles) purified by passage on a basic alumina column, 0.19 ml of a 1.57M solution of MAO in toluene ($3 \times 10^{-4}$ moles), 0.3 ml of a 1M solution of aluminum triisobutyl in toluene ($3 \times 10^{-4}$ moles) and 0.1 ml of an 0.01M solution of $Cp.TiCl_3$ in toluene ($1.0 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 3.759 g of polymeric product were obtained (yield 24%).

2.812 g of polymer were extracted with methylethylketone at boiling point for 8 hours, producing 2.609 g of syndiotactic polystyrene (insoluble fraction of 92.9%, syndiotactic polystyrene yield: 22.3%).

EXAMPLE 5

17.2 ml of styrene (0.15 moles) purified by passage on a basic alumina column, 0.19 ml of a 1.57M solution of MAO in toluene (3×10−4 moles), 14 mg of aluminum trifluoride trihydrate ($1.0 \times 10^{-4}$ moles), 0.1 ml of a 1M solution of aluminum triisobutyl in toluene ($1.0 \times 10^{-4}$ moles) and 0.1 ml of an 0.01M solution of Cp.TiCl$_3$ in toluene ($1.0 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 6.327 g of polymeric product were obtained (yield 40.5%).

2.329 g of polymer were extracted with methylethylketone at boiling point for 8 hours, producing 2.227 g of syndiotactic polystyrene (insoluble fraction of 95.6%, syndiotactic polystyrene yield: 38.7%) with stereoregularity of 99.9% and with Mw of 378,000.

COMPARATIVE EXAMPLE 6

17.2 ml of styrene (0.15 moles) purified by passage on a basic alumina column, 0.19 ml of a 1.57M solution of MAO in toluene ($3 \times 10^{-4}$ moles), 0.1 ml of a 1M solution of aluminum triisobutyl in toluene ($1.0 \times 10^{-4}$ moles) and 0.1 ml of an 0.01M solution of Cp.TiCl$_3$ in toluene ($1.0 \times 10^{-6}$ moles) were charged into a tailed test-tube under an inert atmosphere.

The reaction was carried out for 2 hours at 90° C.

At the end, the mixture was suspended in 200 ml of methanol acidified with 0.5 ml of concentrated HCl. The solid obtained was filtered, washed with ethanol and dried in an oven at 70° C. 2.972 g of polymeric product were obtained (yield 18.7%).

2.607 g of polymer were extracted with methylethylketone at boiling point for 8 hours, producing 2.434 g of syndiotactic polystyrene (insoluble fraction of 93.4%, syndiotactic polystyrene yield: 17.5%).

EXAMPLE 6

17.2 ml of styrene (0.15 moles) purified by passage on a basic alumina column, 0.13 ml of a 1.57M solution of MAO in toluene ($2 \times 10^{-4}$ moles), 14 mg of aluminum trifluoride trihydrate ($1.0 \times 10^{-4}$ moles), 0.1 ml of a 1M solution of aluminum triisobutyl in toluene ($1.0 \times 10^{-4}$ moles) and 0.1 ml of an 0.01M solution of Cp.TiCl$_3$ in toluene ($1.0 \times 10^{-6}$ moles) were charged into a tailed test-tube under an inert atmosphere.

The reaction was carried out for 2 hours at 90° C. At the end, the mixture was suspended in 200 ml of methanol acidified with 0.5 ml of concentrated HCl. The solid obtained was filtered, washed with ethanol and dried in an oven at 70° C. 6.001 g of polymeric product were obtained (yield 38.4%).

2.474 g of polymer were extracted with methylethylketone at boiling point for 8 hours, producing 2.259 g of syndiotactic polystyrene (insoluble fraction of 91.3%, syndiotactic polystyrene yield: 35.1%) with stereoregularity of 99.9% and with Mw of 416,000.

EXAMPLE 7

17.2 ml of styrene (0.15 moles) purified by passage on a basic alumina column, 0.1 ml of a 1.57M solution of MAO in toluene ($1.57 \times 10^{-4}$ moles), 14 mg of aluminum trifluoride trihydrate ($1.0 \times 10^{-4}$ moles), 0.1 ml of a 1M solution of aluminum triisobutyl in toluene ($1.0 \times 10^{-4}$ moles) and 0.1 ml of an 0.01M solution of Cp.TiCl$_3$ in toluene ($1.0 \times 10^{-6}$ moles) were charged into a tailed test-tube under an inert atmosphere.

EXAMPLE 8

13.3 ml of styrene (0.116 moles) purified by passage on a basic alumina column, 0.56 ml of a 1.57M solution of MAO in toluene ($8.73 \times 10^{-4}$ moles), 13 mg of aluminum trifluoride trihydrate ($9.6 \times 10^{-5}$ moles) and 0.1 ml of an 0.01M solution of Cp.TiCl$_3$ in toluene ($1.0 \times 10^{-6}$ moles) were charged into a tailed test-tube under an inert atmosphere.

The reaction was carried out for 30 minutes at 90° C. At the end, the mixture was suspended in 200 ml of methanol acidified with 0.5 ml of concentrated HCl. The solid obtained was filtered, washed with ethanol and dried in an oven at 70° C. 1.603 g of polymeric product were obtained (yield 13.2%).

1.007 g of polymer were extracted with methylethylketone at boiling point for 8 hours, producing 946 mg of syndiotactic polystyrene (insoluble fraction of 94%, syndiotactic polystyrene yield: 12.4%).

COMPARATIVE EXAMPLE 7

13.7 ml of styrene (0.116 moles) purified by passage on a basic alumina column, 0.56 ml of a 1.57M solution of MAO in toluene ($8.8 \times 10^{-4}$ moles) and 0.1 ml of an 0.01M solution of Cp.TiCl$_3$ in toluene ($1.0 \times 10^{-6}$ moles) were charged into a tailed test-tube under an inert atmosphere.

The reaction was carried out for 30 minutes at 90° C. At the end, the mixture was suspended in 200 ml of methanol acidified with 0.5 ml of concentrated HCl. The solid obtained was filtered, washed with ethanol and dried in an oven at 70° C. 1.132 g of polymeric product were obtained (yield 9.3%).

660 mg of polymer were extracted with methylethylketone at boiling point for 8 hours, producing 610 mg of syndiotactic polystyrene (insoluble fraction of 92.5%, syndiotactic polystyrene yield: 8.6%).

What is claimed is:

1. A process for the preparation of a crystalline vinylaromatic polymer with a high degree of syndiotaxy, comprising:
   polymerizing a vinylaromatic monomer, alone or mixed with at least one other copolymerizable ethylenically unsaturated monomer, in the presence of a catalyst system consisting essentially of:
   a) a complex of titanium of Formula (I):

$$CpTiX_1X_2X_3 \qquad (I)$$

wherein Cp represents a cyclopentadienyl ligand optionally substituted with $C_1$–$C_{10}$ alkyl radicals; and
   wherein $X_1$, $X_2$, $X_3$, independently are selected from the group consisting of a halogen, an alkyl group, an alkoxide, a carboxylate and a di(alkyl)amide having from 1 to 10 atoms;
   b) a polyalkylaluminoxane, wherein the alkyl group contains from 1 to 8 carbon atoms; and c) aluminum trifluoride.

2. The process according to claim 1, wherein the molar ratio of said vinylaromatic monomer to Ti is between 10,000 and 1,000,000.

3. The process according to claim 1, wherein said polyalkylaluminoxane is treated under vacuum at a temperature of from 20 to 80° C. for at least one hour.

4. The process according to claim 1, wherein a molar ratio of aluminum to Ti is between 50 to 5,000.

5. The process according to claim 1, wherein said catalytic system comprises an aluminum alkyl containing 1 to 6 carbon atoms.

6. The process according to claim 5, wherein said aluminum alkyl substitutes an amount of from 0 to 75% in moles of said polyaluminoxane.

7. The process according to claim 1, wherein the ratio between the moles of said polyalkylaluminoxane (b), or a sum of the moles of polyalkylaluminoxane and aluminum alky, and the moles of said aluminum fluoride is between 15 and 1.

8. The process according to claim 1, wherein the aluminum fluoride is used singly or in a complex with a compound selected from the group consisting of water, a linear ether, a cyclic ether and a ketone.

9. A catalytic composition, comprising:

a) a complex of titanium having the Formula:

$$CpTiX_1X_2X_3 \qquad (I)$$

wherein Cp represents a cyclopentadienyl ligand optionally substituted with $C_1$–$C_{10}$ alkyl radicals; and wherein $X_1$, $X_2$, $X_3$, independently are selected from the group consisting of a halogen, an alkyl group, an alkoxide, a carboxylate and a di(alkyl)amide having from 1 to 10 atoms;

b) a polyalkylaluminoxane, wherein the alkyl group contains from 1 to 8 carbon atoms; and c) aluminum trifluoride.

* * * * *